United States Patent [19]

Gabas

[11] Patent Number: 5,007,622
[45] Date of Patent: Apr. 16, 1991

[54] AUTOMOBILE SUN VISOR HINGE SPRING

[75] Inventor: Carlos Gabas, Barcelona, Spain

[73] Assignee: Industrias Techno-Matic, S.A., Barcelona, Spain

[21] Appl. No.: 495,467

[22] Filed: Mar. 16, 1990

[30] Foreign Application Priority Data

Mar. 17, 1989 [ES] Spain ................... 8900980

[51] Int. Cl.5 .................... F16F 1/18; E05C 5/00; B60J 3/00; F16B 21/00
[52] U.S. Cl. ...................... 267/158; 16/342; 296/97.12; 403/325; 403/327
[58] Field of Search ............ 267/158, 160; 296/97.1, 296/97.12, 97.13; 16/335, 342; 403/325, 327, 365; 160/DIG. 3

[56] References Cited

U.S. PATENT DOCUMENTS

| 2,376,026 | 5/1945 | Bennett | 267/158 |
| 3,580,619 | 5/1971 | Maltais | 403/365 |
| 4,481,599 | 6/1989 | Cebollero | 296/97.12 |
| 4,778,160 | 10/1988 | Cebollero | 267/158 |

Primary Examiner—Robert J. Oberleitner
Assistant Examiner—Josie A. Ballato
Attorney, Agent, or Firm—Michael J. Striker

[57] ABSTRACT

A spring for automobile sun visor hinge and which is formed as a single member produced from a resilient metal sheet of a substantially rectangular profile by successively folding the sheet to substantially 90° about successive four rounded edges. The spring member includes four generally rectangular portions and a channel-shaped curved portion. The first rectangular portion has a free edge located relatively closely adjacent to the fourth rounded edge that forms one end of the fourth rectangular portion and separates the fourth rectangular portion from the channel-shaped curved portion, the channel-shaped curved portion has a free end edge located relatively closely adjacent to the third rounded edge that forms another end of the fourth rectangular portion and separates the fourth rectangular portion from the third rectangular portion.

4 Claims, 1 Drawing Sheet

AUTOMOBILE SUN VISOR HINGE SPRING

BACKGROUND OF THE INVENTION

This invention relates to a spring for the hinges of sun visors fitted to automobiles, in particular for tightening or holding support pins of such hinges.

The integration in the structures of the sun visors with which automobiles are normally equipped, of all kinds of technical novelties designed both for facilitating the driving of the vehicles and increasing the security and comfort conditions in the interior thereof, such as a passenger vanity mirror equipped with an electrical illumination device and even with a device for concealing the mirror itself, air freshening devices, etc., results in an increase in weight of such sun visors over those having a simple structure. Consequently, this increases the mechanical load acting mainly and specifically on the hinge support pin and on the tightening and holding means for such support pin. It is precisely the operation of such retaining or tightening means which allows the user to define the set positions of use of the sun visor. Up to date, such mechanical load, namely, the turning moment on the sun visor support pin compensated by the retaining or tightening means for the support pin, caused both by the sun visor and the devices contained therein and by the vibrations caused by the moving vehicle, generally reach values lying between 0.6 Nm and 1.2 Nm, with stable positions of use being obtained with the spring disclosed in Spanish utility model No. 292,644 (corresponding to U.S. Pat. No. 4,778,160).

The integration of devices offering greater service and housing also a wider range of components in the sun visor structures mean that, under the same conditions of use, the mechanical moment acting on the sun visor support pin exceeds the forementioned value of 1.2 Nm. This in turn means that with the use of the known support pin retaining or tightening means, the sun visor unit is positionally unstable, and may suddenly undesirably turn downwards, with the obvious drawbacks of all types that this represents, with reference to both comfort and to safety.

SUMMARY OF THE INVENTION

The object of the invention is to eliminate the positional unstability of the sun visor when the latter includes additional elements and/or devices contributing to increase of the weight and causing large mechanical moments which act on the sun visor support pin and on the retaining members of the support pin. The object of the invention is achieved by providing a new spring for automobile sun visor hinges which is able to satisfactorily withstand the above mentioned forces.

According to the invention, the spring for automobile sun visor hinges is formed by a single member produced from a flexible metal sheet of a basically rectangular profile which, after successive folding to approximately 90° along four corresponding rounded edges, forms four portions, first, second, third and fourth, of a generally rectangular surface. The free edge of the first rectangular portion faces and is relatively, closely spaced from the rounded edge forming the fourth rectangular portion with the adjacent portion having a channel-shaped curved surface such that the corresponding terminal edge of such curved portion faces and is spaced at a relatively short distance from a further rounded edge forming the fourth rectangular portion immediately adjacent the curved portion.

The hinge spring of the invention essentially defines an approximately semi-cylindrical channel-shaped housing, the defining surface of which is the one corresponding to that of the curved portion and that of the rectangular portion imediately adjacent thereto, both described above. The housing receives the hinge support pin, and, furthermore, defines a rectangular section parallellepiped which, among other functions, ensures fixed positioning of the spring inside the housing formed in the sun visor structure.

In the spring for automobile sun visor hinges according to the invention, both lateral edges of the curved portion are extended over a relatively short distance beyond the corresponding lateral edges of the rectangular surface portions. The curved portion is divided into two wing-like portions by an intermediate cutaway which extends perpendicular to the longitudinal axis of the spring.

Such cutaway in the curved portion of the hinge spring ensures that the retaining or tightening pressure exercised on the surface of the hinge support pin is applied more uniformly. A further additional advantage of this cutaway is that it allows the degree of holding force to be reduced at the time of manufacture by making a wider or narrower cutaway In other words, the wider the cutaway, the less holding force it applies.

The automobile sun visor hinge spring according to the invention is also characterized in that the fourth rectangular portion adjacent the curved portion, has at one end thereof a tab which extends over a relatively short distance and is slightly inclined It is also important to note that the wall of the first rectangular portion is provided with a coupling dog.

The tab-shaped extension and one of the ends of the fourth rectangular portion which is immediately adjacent the curved portion of the spring facilitates guiding of the hinge support pin in the channel-shaped housing defined by the curved portion and by the fourth rectangular portion adjacent thereto. The purpose of the coupling dog is to prevent the spring from being taken out or moved from the operative position thereof once it has been lodged within the housing provided in the sun visor structure.

The present invention both as to its construction so to its method of operation, together with additional objects and advantages thereof, will be best understood from the following detailed description of specific embodiments when read in connection with the accompanying drawings

DETAILED DESCRIPTION OF THE PREFERRED EMBODIMENT

Figures 1, 2:
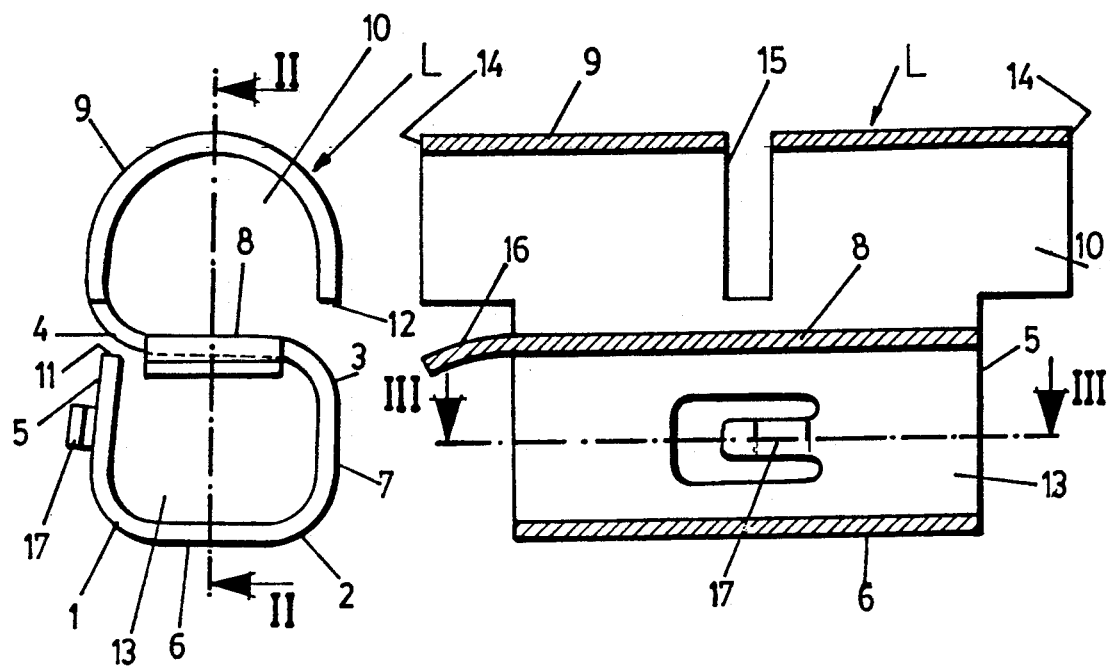
FIG. 1 is a side view of the spring according to the invention.
FIG. 2 is a sectional longitudinal view along lines II—II in FIG. 1.

The automobile sun visor hinge spring according to the invention is formed by a single metallic sheet L having a basically rectangular profile, preferably by a steel strip, having appropriate mechanical properties consonant with the purpose of the spring, but particularly with respect to resilience.

The spring is folded successively along four rounded edges 1, 2, 3 and 4 approximately by 90°, respectively forming first, second, third and fourth portions 5, 6, 7 and 8, having an approximately rectangular surface. The rounded edge 4 forms the start of the channel-shaped curved portion 9 as shown in FIG. 1 such that the end edge 12 of the curved portion 9 faces the rounded edge 3 defining the fourth rectangular portion 8.

As seen in FIG. 1, the mechanical folding process of the spring leaves the edge 11 of the rectangular portion 5 relatively closely spaced from the rounded edge 4 from which the curved portion 9 extends. In a similar way, the terminal edge 12 of the curved portion 9 is also relatively closely spaced from the rounded edge 3 defining the rectangular portion 8.

In this way the folding process for shaping the hinge spring of the invention and described as an example, essentially defines an approximately semi-cylindrical channel-shaped housing 10 formed by the curved portion 9 and the rectangular portion 8 and a rectangular section parallelepiped 13 formed by the rectangular portions 5, 6, 7 and 8.

The purpose of the channel-shaped housing 10 is to receive and lodge the hinge support pin (which has not been shown in the drawing since it does not form part of the invention) while the parallelepiped 13 sets the operative position of the spring in the sun visor structure for which it is designed.

Both end portions 14 of the curved portion 9 are extended, while maintaining the profile of the curved portion constant, beyond the corresponding edges of the rectangular portions 5, 6, 7 and 8, thereby providing a larger contact surface with the hinge support pin, as illustrated in FIG. 2 of the accompanying drawing.

FIG. 2 also shows in detail the cutaway 15 in the curved portion 9 and the tab 16 formed by extension of one of the ends of the rectangular portion 8. The cutaway 15 extends from the edge 12 of the curved portion 9 to a relatively short distance from the rounded edge 4. The cutaway 15 is perpendicular to the longitudinal axis of the spring and divides the curved portion 9 into two parts to make the pressure exerted by the spring on the hinge support pin, as uniform as possible. The purpose of the tab 16 is to facilitate the insertion of the hinge support pin, when mounting the sun visor unit, into the channel-shaped housing 10 defined by the curved portion 9 and the rectangular portion 8.

Figure 3:
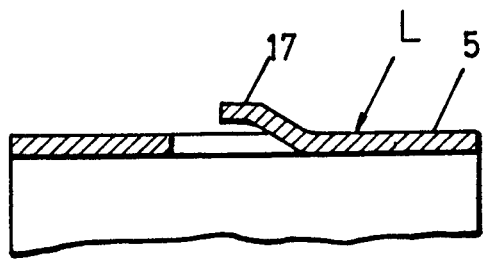
FIG. 3 is a detailed partial cross-sectional view along lines III—III in FIG. 2.

FIG. 3 is a detailed view of the coupling dog 17 formed in the rectangular portion 5. The coupling dog 17 serves to prevent the spring from being removed from the housing 19 once it has been inserted in the housing 19 of a sun visor structure 18.

Figure 4:
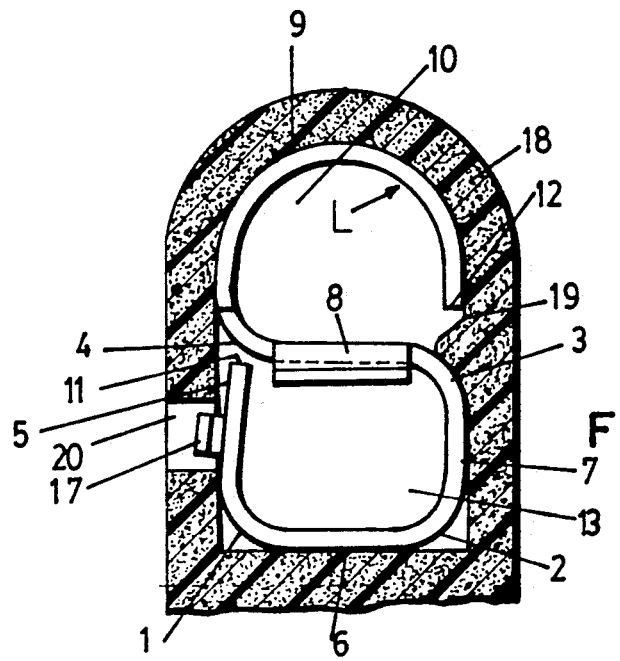
FIG. 4 is a cross-sectional view of the spring according to the invention housed in a sun visor structure.

FIG. 4 shows how the automobile sun visor hinge spring of the invention is used. FIG. 4 is a partial crossection of a portion of the sun visor 18. This section has been made across a region where the housing 19 for holding the spring according to the invention is located. Once the spring has been inserted in the housing 19 and the coupling dog 17 located in the cavity 20 prepared therefore in the sun visor structure 18, the coupling dog 17 prevents the spring from coming out of the housing 19 under any circumstances. The sun visor support pin (not shown as said above), which is one of the constituent members of the hinge for automobile sun visors, penetrates in the channel-shaped housing 10. This operation is facilitated by the tab 16. The dimensions both of the housing 19 and of the spring itself have been selected so that the support pin is inserted against the force of the curved portion 9 and the rectangular portion 8 which must in consequence yield. It is precisely the permanent pressure of the curved portion 9 and of the rectangular portion 8 on the support pin (not shown) which determines the positional stability of the sun visor unit.

The structure as described is very effective to retain automobile sun visors having relatively high moments of rotation (above 1.2 Nm) appropriately in the desired position. Furthermore, it is not unfavorably affected either by low temperatures, or by the high temperatures which normally occur when the motor vehicles are parked in the sun for many hours.

While the invention has been illustrated and described with a reference to a specific embodiment of an automobile sun visor hinge spring, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A spring for automobile sun visor hinge, comprising a member formed from a resilient metal sheet of a substantially rectangular profile by successively folding the sheet to substantially 90° about successive first, second, third and fourth rounded edges, said member including first, second, third and fourth generally rectangular portions and a channel-shaped curved portion, said first rectangular portion having a free edge located relatively closely adjacent to the fourth rounded edge that forms one end of the fourth rectangular portion and separates said fourth rectangular portion from said channel-shaped curved portion, said channel-shaped curved portion having a free end edge located relatively closely adjacent to the third rounded edge that forms another end of said fourth rectangular portion and separates said fourth rectangular portion from the third rectangular portion.

2. A spring as set forth in claim 1, wherein said channel-shaped curved portion has two opposite lateral edges extending beyond respective lateral edges of said first, second, third and fourth rectangular portions, said channelshaped curved portion having a cutaway defining two wing-like portions of said channel-shaped curved portion arranged perpendicular to a longitudinal axis of said spring.

3. A spring as set forth in claim 1, wherein said fourth rectangular portion has, at one of lateral edges thereof, a slightly inclined tab extending a relatively short distance beyond said one lateral edge.

4. A spring as set forth in claim 1, wherein said first rectangular portion has a coupling dog for engaging a respective cavity in a sun visor housing to prevent said spring from being removed from the sun visor housing after said spring has been inserted into the sun visor housing.

* * * * *